J. H. STYLES.
GAS TUBE COUPLING.
APPLICATION FILED FEB. 18, 1916.
1,279,785.
Patented Sept. 24, 1918.
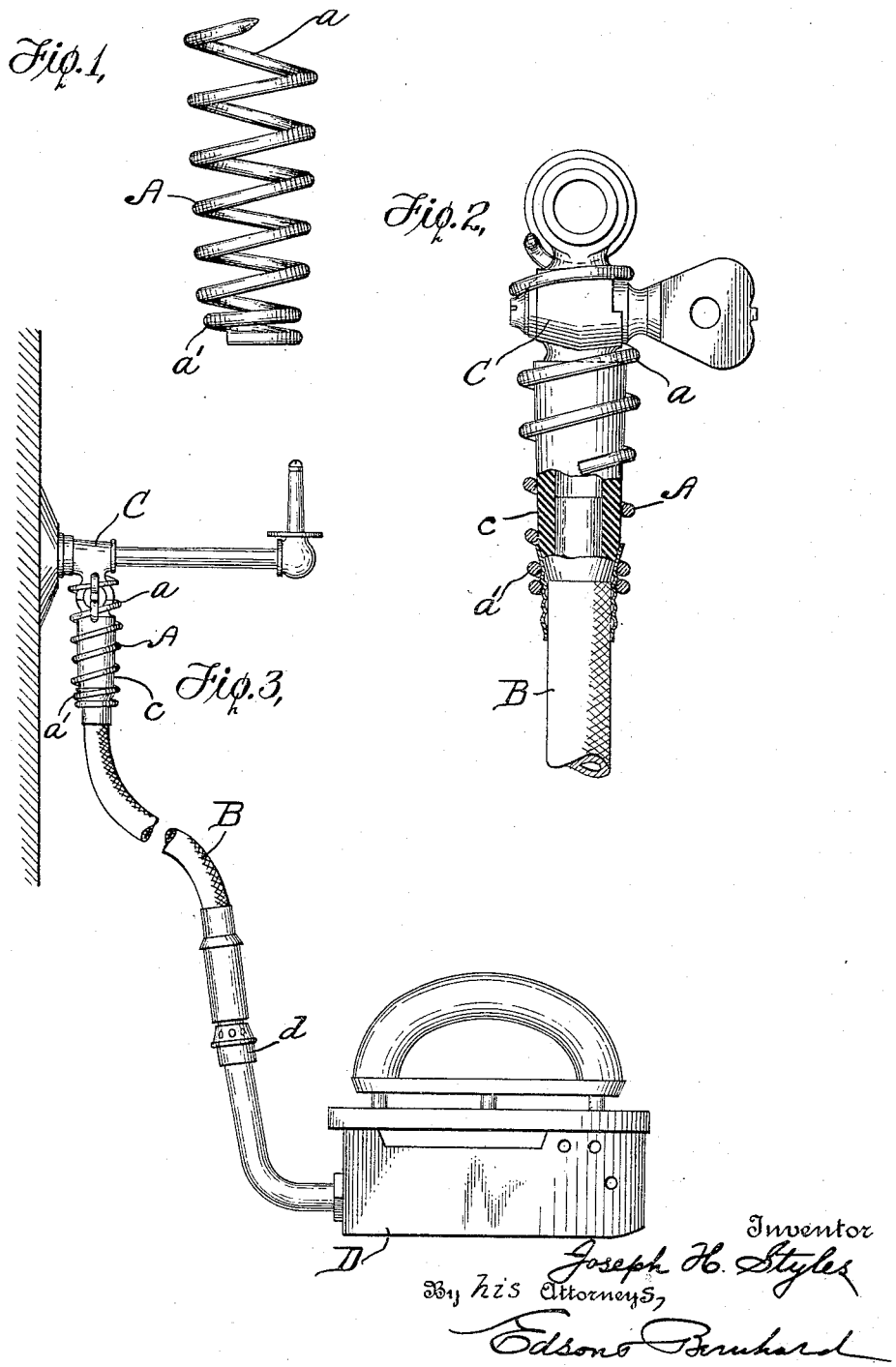

UNITED STATES PATENT OFFICE.

JOSEPH H. STYLES, OF NEW YORK, N. Y.

GAS-TUBE COUPLING.

1,279,785. Specification of Letters Patent. Patented Sept. 24, 1918.

Application filed February 18, 1916. Serial No. 79,011.

*To all whom it may concern:*

Be it known that I, JOSEPH H. STYLES, a citizen of the United States, residing at the city of New York, borough of Manhattan, county and State of New York, have invented a certain new and useful Gas-Tube Coupling, of which the following is a specification.

It is well known that in various appliances for utilizing illuminating gas it is common to conduct the gas to said appliance from a wall or other fixture by means of a flexible hose or tube, the end portions of which hose or tube are usually connected by frictional engagement with the appliance and with the fixture, respectively. In most cases, the flexible hose or tube is provided with flexible tapering nipples at the end portions thereof, but experience has shown conclusively that these flexible nipples, either or both of them, are liable to be pulled off the fixture or the gas appliance, such displacement being due to the weight of the tube or to the movement of the gas appliance, or to a variety of other causes, thus resulting in the escape of an asphyxiating gas.

The object of this invention is to provide means for retaining the flexible hose or tube in fixed engagement with the gas fixture or with the gas appliance whereby accidental disengagement of the flexible hose or tube is prevented.

In a preferred form, the retainer embodies a helix composed of wire the convolutions of which are more closely arranged at one end than at the other end of said retainer, the diameter of the retainer at that end where the convolutions are more closely grouped being smaller than the diameter at the end at which the convolutions are spread farther apart. In use, the retainer is slipped over the hose or tube for the smaller end of said retainer to frictionally embrace the nipple at the end of the hose or tube, thus precluding the retainer from pulling off the hose. Said nipple of the hose is now connected to the fixture or the appliance, and then the retainer is rotated upon the hose or the nipple in such manner that the spread convolutions of said retainer will have engagement with the fixture or the appliance as the case may be, as a result of which the retainer is frictionally held upon the tube and it has positive or locking engagement with the fixture or the appliance.

The retainer is not only simple in construction and economical of manufacture, but it is readily applied and adjusted and, moreover, is efficient in operation.

In the drawings,

Figure 1 is an elevation of the article constituting my gas hose retainer.

Fig. 2 is an elevation, partly in section, illustrating the retainer applied to a gas tube and to a gas cock.

Fig. 3 is a view illustrating a mode of using the retainer in connection with a flexible tube for feeding gas from a fixture to a sad iron.

A practical form of the invention is illustrated in the several figures of the drawings, wherein A designates the retainer. Said retainer is shown as consisting of a single piece of wire bent in the form of a helix, the internal diameter of the helix at one end portion being greater than the corresponding diameter of said helix at the opposite end portion thereof. It is preferred to open or spread the helix at the larger end thereof to a greater extent than the convolutions of the helix at the opposite end. Thus, in Fig. 1 the convolutions $a$ of the helix retainer are spread or opened to a greater extent than the convolutions $a'$ at the smaller end of the helix.

The retainer is employed in connection with a flexible tube or hose B and with a suitable fixture C or a gas appliance D. As shown more particularly in Fig. 2, the retainer A is applied to the gas tube B in a manner to have frictional engagement therewith, said retainer being adapted for positive or locking engagement with the fixture C. The tube B of Fig. 2 is shown as having a tapering nipple $c$, the latter being composed of flexible material and having friction-tight engagement with the gas cock C.

In using the device, it is slipped over the flexible tube or hose B for the windings or convolutions $a'$ thereof to engage with the flexible nipple $c$ at the smaller diameter, or where the nipple is attached to the tube. The retainer exceeds in length the nipple so that the spread convolutions $a$ of said retainer will project beyond the end portion of the nipple. The retainer having been applied to the hose and the nipple thereof, the operator proceeds to slip the nipple upon the fixture C, whereby the nipple is moved into friction-tight engagement with said fixture. The retainer is fitted rotatably to the nipple and the hose and in the operation of adjusting said nipple upon the fixture the retainer is rotated in order that the spread convolutions *a* will engage positively with said fixture, as illustrated more particularly in Figs. 2 and 3.

The retainer thus has frictional engagement with the nipple of the hose so that the retainer cannot be pulled off the hose, nor can the hose be pulled out of the retainer, but owing to the positive locking engagement of the retainer with the fixture it is apparent that the hose cannot be uncoupled accidentally or otherwise from the fixture.

In Fig. 3 of the drawings there is shown one mode of using the retainer wherein the element A acts as a positive coupling between the flexible tube B and the wall fixture C, whereby the sad iron D is adapted to be moved or shifted in any direction without uncoupling the tube or hose B from said fixture C. The form of sad iron shown in Fig. 3 is equipped with a Bunsen burner *d* and the flexible tube or hose is attached by a threaded coupling to the sad iron. In using the flexible tube or hose with other forms of gas appliances, the tube may be connected by a friction coupling, similar to the nipple *c*, to said appliance, in which event the helix retainer A of my invention may be employed, and to good advantage, in coupling the hose to the gas appliance.

It is evident that the helix retainer may be used in connection either with a wall fixture or with a gas appliance and, accordingly, I reserve the right to employ the retainer of this invention as a coupling between a flexible tube or hose and any gas inlet or outlet.

Having thus fully described the invention, what I claim as new and desire to secure by Letters Patent is:

1. In a device of the class described, the combination with a flexible tube, and a suitable gas device, of a helical retainer the convolutions of which are increased in diameter from one end portion toward the opposite end portion of said retainer, the convolutions of less diameter operating to grip the retainer upon the flexible tube whereas certain of the convolutions of larger diameter are adapted, by the rotative movement of the retainer, to be positioned into locking engagement with said gas device.

2. In a coupling of the class described, the combination with a flexible tube, and a gas device, of a tapering helical retainer having frictional engagement with said flexible tube exteriorly thereof, said helical retainer being rotatable upon the flexible tube and the larger end portion of said tapering retainer being coupled by the rotary motion imparted thereto with said gas device, thereby effecting a locking engagement between the retainer and the gas device.

3. In a device of the class described, the combination with a flexible tube, and a suitable gas device, of a helical retainer the convolutions of which are increased in diameter from one end portion toward the other end portion of the retainer and said convolutions toward the larger end of the retainer being spaced relatively to each other for greater distances than the intervals separating the smaller convolutions, said convolutions at the smaller end portion of the retainer operating to tightly grip the flexible tube whereas certain of the separated and larger convolutions are adapted, by a rotative movement of the retainer, to be positioned into locking engagement with the gas device.

In testimony whereof I have hereunto subscribed my name.

JOSEPH H. STYLES.

Copies of this patent may be obtained for five cents each, by addressing the "Commissioner of Patents, Washington, D. C."